3,235,486
METHOD FOR REJUVENATING CATALYST EMPLOYED IN THE HYDROCRACKING OF HYDROCARBON OILS
George Constabaris and Robert H. Lindquist, Berkeley, Calif., assignors, by mesne assignments, to Chevron Research Company, a corporation of Delaware
No Drawing. Filed July 1, 1963, Ser. No. 292,086
7 Claims. (Cl. 208—111)

The present invention relates to catalytic conversion processes and to the rejuvenation of catalysts which have become deactivated to a difficultly regenerable condition after long exposure to hydrogenative conversion conditions. More especially, the invention relates to a catalytic hydrocracking process for converting petroleum distillates and residual to various valuable products for sustained periods of on-stream operation and relates more particularly to the rejuvenation of hydrocracking catalysts which after long exposure to hydrocarbon feed under hydrocracking conditions have become deactivated and so changed that conventional removal of the accumulated carbonaceous deposits does not regain an appreciable percentage of the original hydrocracking activity.

Although catalytic hydrocracking is recognized as one of the most useful processes available to modern petroleum refiners and in its preferred form can be operated for long long on-stream periods under reasonable conditions, the economic attractiveness of the process could be further improved by a procedure for satisfactory regeneration of the hydrocracking catalysts after they have become deactivated by long on-stream periods of operation.

As shown in Scott Patent 2,944,006, hydrocracking processes to convert hydrocarbon feed to valuable products can be carried out for long on-stream periods at reasonable operating conditions without intolerable catalyst fouling rates with a sulfide of nickel or cobalt disposed on an active siliceous cracking catalyst support, provided the hydrocarbon feed brought into contact with such catalyst has a low nitrogen content. However, it has been found that such catalysts after such long exposure to hydrocarbon feed under hydrocracking conditions becomes deactivated with the metal component so changed that conventional removal of the accumulated carbonaceous deposits does not result in the catalyst regaining an appreciable or adequate percentage of its original hydrocracking activity. During the long exposure to hydrocracking and other hydrogenative conversion conditions, such catalysts undergo a change which appears to be related, at least in part, to a crystallite growth phenomenon of the hydrogenating metal component of the catalyst. This crystallite growth phenomenon either brings about or is related to the inability of the hydrocracking catalyst to be regenerated by conventional regeneration procedures to an adequate proportion of its fresh catalyst activity. When in following the suggestions in the literature, an attempt is made to regenerate the catalyst by combustion of the carbonaceous deposits, it is found that the hydrogenating metal component is not redistributed but rather remains in a form which is substantially inactive.

Therefore, the present invention provides a method for restoring deactivated catalysts to a substantially greater degree than is obtainable through rejuvenation by combustion of the carbonaceous deposits.

Further, it is highly desirable to be able to restore catalyst activity by treatments conducted in situ without having to remove the large amounts of catalysts normally contained in fixed bed reactors.

The present invention provides a novel method of rejuvenating deactivated catalysts and the method is capable of being applied to a bed of catalyst without removing it from the reactor. In the regeneration procedure of the present invention, the deactivated catalyst is treated in a sequence of steps with careful attention to certain limiting factors. The manner of treating the catalyst to restore its original activity is unobvious, particularly in that the combination of steps and conditions together with the successful results obtained are contrary to what would be expected from the prior art.

Briefly, in the process of the present invention, a series of treating steps in sequence are applied to a supported hydrogenating catalyst which before long exposure to hydrocarbon feed under hydrogenative conversion conditions is an active catalyst composed of at least one hydrogenating metal component selected from Group VIII metals and compounds thereof, exclusive of noble metals and compounds thereof, disposed on a high surface area support, but which catalyst after long exposure to hydrocarbon feed under hydrogenative conversion conditions has accumulated carbonaceous deposits and has become deactivated with the metal component so changed that conventional removal of the accumulated carbonaceous deposits does not result in recovery of a substantial percentage of the original hydrogenative conversion activity. In this process, the deactivated catalyst is contacted before removal of the carbonaceous deposits with an aqueous solution of weakly acidic organic acid capable of forming outside hydrogenating metal component salts which are decomposable below 1000° F., said contacting being at temperatures above 100° F. for at least one hour.

The present method differs from that of serial application No. 292,080, filed concurrently by Jack W. Unverferth et al. for "Catalyst Rejuvenating Process," which is directed to contacting deactivated catalyst with a strong acid aqueous solution under certain specified conditions. In such process of my copending application, it is necessary to use no more strong acid than is stoichiometrically necessary to form salts with the hydrogenating metal present in the deactivated catalyst and no greater volume of said strong acid solution than fills the pores of the catalyst being rejuvenated. These requirements are necessary with the use of strong acid in order to avoid the degrading loss of catalyst support which is susceptible to attack by the strong acid. In the method of the present invention, it is not necessary to so limit the concentration or amount of acid solution in order to avoid attack on the catalyst support or the metal of the reactor. However, in the process of the present invention, other limits must be observed. Thus it is necessary that the aqueous weakly organic acid-treating solution be in contact with the deactivated catalyst at a temperature of over 100° F. for at least one hour but usually for not longer than twenty-four hours. For obtaining the highest activity and the best of all catalyst properties, the time of aqueous acid treatment is preferably not more than ten hours.

We have found that the hereindescribed process gives a rejuvenated catalyst having a substantial percentage of the original hydrogenative conversion activity and showing very little loss in surface area of the support. A particular discovery made in connection with the present invention is that in a deactivated catalyst, the carbonaceous deposits thereon appear to cover or to protect the support but leave exposed for reaction with the acid the hydrogenating metal component, particularly that portion of the metal component which is in the form of the larger, relatively inactive crystallites. Thus, the acid solution readily reacts with the hydrogenating metal component but does not appreciably attack the catalyst support, even though there is present a substantial excess of acid over that equivalent to the hydrogenating metal present. The high surface area of the catalyst support is thereby retained. The formation of the hydrogenating metal salts and their decomposition along with the oxidation of the carbonaceous deposits brings about a redistribution of the hydrogenating metal component into a finely divided form which is much more catalytically active than the large crystallites in the deactivated catalyst. Not only does the carbonaceous deposits protect acid-sensitive supports during the acid treatment, but the oxidation of these deposits in conjunction with the decomposition and oxidation of the salts of the hydrogenating metal appears to aid in converting the hydrogenating metal component to a highly active form. It will be noted that the acidization products are not removed or washed from the catalyst.

The invention has particular and preferred application to thermactivated hydrocracking catalyst which has become deactivated during long exposure to hydrocarbon feed under hydrocracking conditions. When a hydrocracking catalyst composed of an active siliceous cracking support having disposed thereon nickel, cobalt or the oxides or sulfides thereof as a hydrogenating component is first prepared, it can be converted to an unusually active form by subjecting the catalyst with the cobalt or nickel present therein in the form of oxides or of compounds decomposed thereto on heating, to a controlled heating or thermactivation as disclosed in copending application Serial No. 794,109 filed February 18, 1959. In such thermactivation, a relatively dry, non-reducing gas such as air, nitrogen or $CO_2$ is passed through the mass of particulate catalyst undergoing treatment at a rate which is preferably at least 10 cubic feet per hour per cubic feet of catalyst at temperatures ranging from about 1200–1600° F. for times ranging from about 0.25 to 48 hours sufficient to give a substantial increase in activity, with the lower temperatures in the stated range being used with the longer times and vice versa. Such a thermactivated hydrocracking catalyst normally loses the increased activity obtained by the thermactivation if the catalyst is subjected to an aqueous treatment, even though the catalyst thereafter is promptly dried.

Surprisingly, thermactivated hydrocracking catalyst which has become deactivated during use can be rejuvenated to a high percentage of the original thermactivated activity by the particular sequence of treating steps including the aqueous acid treatment of the present invention but without repeating the thermactivation. This is indeed an unexpected result since thermactivated catalyst as freshly prepared before contact with hydrocarbons loses its thermactivation activity by any aqueous treatment. Also, a deactivated catalyst which is oxidized to remove the carbonaceous deposits and then is treated with aqueous acid to convert the hydrogenating metal components to salts which in turn are subsequently decomposed, does not regain as high a percentage of the original thermactivated activity without repeating the thermactivation treatment. Since the high temperature needed for thermactivation is difficult to attain in the vessels usually available in a petroleum refinery, it is much preferred to avoid having to resort to a thermactivation treatment in any catalyst rejuvenation process.

The foregoing and other advantages of the present invention will be apparent from the following more detailed description taken in connection with the examples. The first step in the process is to contact the deactivated catalyst before removal of the carbonaceous deposits with an aqueous solution of weakly acidic organic acids having dissociation constant below $K_a$ of $10^{-2}$ preferably less than $10^{-3}$ but above $10^{-6}$. The acids are those which, with the hydrogenating metal, form salts preferably sufficiently soluble to dissolve in one pore volume of the aqueous treating liquid at the treating temperature. Most preferred is acetic acid. Other suitable acids are, for example, formic, tartaric and citric acids.

The acid concentration in the aqueous treating solution should be at least 5 molar and preferably is at least 7 molar. Higher concentrations, such as glacial acidic acid, can be used. For best results the amount of acid in the treating solution is at least enough to react with substantially all the hydrogenating metal component present on the catalyst. The volume of aqueous acid solution should be enough to thoroughly wet the surface of the deactivated catalyst and preferably is at least enough to fill the pores of the catalyst. Normally it is not desirable to use a volume of acid treating solution greater than will cover the catalyst in bulk; i.e., fill the catalyst pores and the void space between the catalyst particles.

The acid-treating solution is kept in contact with the deactivated catalyst for at least one hour at a temperature of 100° F., preferably in the range of 125 to 175° F. The temperature and pressure conditions are such as to maintain the treating agent in the liquid phase. However, it is desirable to avoid raising the temperature under superatmospheric pressure to that at which appreciable corrosion of the reactor and/or treating vessel occurs.

The contact between the aqueous acid solution and catalyst is preferably not continued for more than ten hours. During the contacting period, the hydrogenating metal component, particularly that portion in the form of large relatively inactive crystallites, is converted substantially completely to soluble metal salts of the treating acid, which salts then become distributed throughout the catalyst support.

Since the treating solution contains some soluble salts of the hydrogenating metal component, some of the hydrogenating metal would be lost if the treating solution is drawn off the catalyst. Hence, particularly when the volume of treating agent is in excess; i.e., not more than about 10 percent in excess of the pore volume, the treated catalysts are preferably dried without removing any of the treating solution. After drying (such as by-passing a dry heated inert gas through the treated catalyst), the carbonaceous deposits are burned off and the metal salts decomposed and converted to the corresponding oxides. For this purpose, a dry combustion supporting gas such as a nitrogen-air mixture is used. Preferably, at least during the initial portion of the burn, the catalyst temperature is controlled below 750° F., usually above 450° F. at the start. Such heat treatment in an oxidizing atmosphere is continued until burning substantially ceases. When the catalyst is in one or more fixed beds, the catalyst is contacted with dry combustion supporting gas at below 750° F. until an initial burning wave has passed through the catalyst beds. Usually, some carbonaceous material still remains on the catalyst and some of the hydrogenating metal component is not completely converted to the oxide. Thereafter, the catalyst is contacted further with the dry combustion supporting gas at a maximum catalyst temperature of at least 50° higher than used in the first burn, but at a temperature controlled below 850° F, until the second burning wave passes through the catalyst beds. Usually, a final burn with the oxygen concentration increased and the temperature of the dry combustion supporting gas increased up to 950° to 1000° F. is carried out until no further burning is observed. Preferably, the oxidations are carried out with an elevated pressure of above 200 p.s.i.g., such as above 500 p.s.i.g. up to 10,000 p.s.i.g. using a circulating inert gas to which is added .1 to 4 mol percent of oxygen during the initial portion of the oxidation and in which the oxygen content is gradually increased In any event the temperature is kept below that at which there is an appreciable loss in the surface area of the catalyst.

The dry combustion supporting gas is preferably free of sulfur oxides and may be any suitable mixture of oxygen with an inert carrier gas. Examples are nitrogen-air flue gas air mixtures. Where the gas is recycled, it is preferred to remove combustion products such as $CO_2$, $SO_2$ and $H_2O$ to prevent their build up in the circulating gas. For this purpose the gas may be scrubbed with a caustic solution or may be subjected to catalytic or adsorptive contacting.

By "dry" combustion supporting gas is meant that the molar concentration of water vapor is relatively low, that is, at least below about 6 mol percent and preferably below 1 mol percent.

Following the oxidation step, the catalyst may be variously treated prior to use or can be used directly in hydrogenative conversion operations. Such treatments can include thermactivation, reduction, and sulfiding. Where the catalyst is to be placed in a hydrocracking operation, the catalyst can be used without further treatment, particularly with sulfur-containing feeds which would sulfide the catalyst during start up to the desired sulfide state for the hydrogenating metal component such as nickel.

The preferred final step in preparing the catalyst for reuse in hydrocracking operations is to convert the hydrogenating metal component to the sulfide. This may be accomplished in any of the several known ways such as by contacting the catalyst with a sulfiding agent such as $H_2S$, mixtures of hydrogen and $H_2S$ and mixtures of hydrogen and organic sulfur compounds reducible to $H_2S$ at the conditions employed. Generally, the catalyst temperature during sulfiding is controlled below 850° F. and preferably below 750° F. The best results are obtained by contacting the oxidized catalyst with a mixture of hydrogen and vaporized organic sulfur compounds such as dimethyl disulfide, isopropyl mercaptan or carbon disulfide at temperatures in the range of 450–650° F. An excess of sulfiding agent is usually employed to insure substantially complete conversion of the oxide of the hydrogenating metal component to the sulfide.

By the above-described procedure, deactivated hydrogenative conversion catalysts can be rejuvenated to a substantial percentage of the original, fresh activity so that the over-all useful life of the catalyst is greatly extended. When applied to the preferred hydrocracking catalysts, particularly to such catalysts with nickel or cobalt hydrogenating metal components, the economic application of the hydrocracking is greatly expanded. Hence the rejuvenation procedure is especially desirable to use as part of a hydrocracking process. In such process, hydrocarbon stocks including hydrocarbon distillates boiling from about 300° to 1100° F., hydrocarbon residuals boiling above about 1050° F., and mixtures thereof are hydrocracked to more valuable lower boiling products by contacting such feeds in a hydrocracking zone with a catalyst comprising the hydrogenating-dehydrogenating component on an active, acid, cracking support at a temperature from 450° to 900° F., preferably with a major portion of the on-stream period below 750° F., a space velocity of from about 0.2 to 5.0 or more, and a hydrogen partial pressure of at least 350 p.s.i.g. with at least 1000 s.c.f. of hydrogen per barrel of feed, there being consumed in the hydrocracking zone at least 500 s.c.f. of hydrogen per barrel of feed converted to products boiling below the initial boiling point of said feed. While nickel sulfide is preferred as the hydrogenating-dehydrogenating component in such hydrocracking conversions, other hydrogenating components are the compounds of metals of Groups VI and VIII of the Periodic Table, which compounds are not readily reduced to the corresponding metal form in the hydrocracking zone. Combinations of metal sulfide with one or more metals and compounds thereof from Groups VIII, VI-B and I-B of the Periodic Table may be used. The amount of the hydrogenating component may be varied from 0.5 to 35% or more, more desirably in the range of 4 to 20%, based on the weight of the entire catalyst composition. The remaining, or cracking, component of the hydrocracking catalyst may be selected from the various siliceous cracking catalysts, such as the composites of silica-alumina, silica-magnesia, silica-alumina-zirconia, silica-zirconia-titania and synthetic metal aluminum silicates (including synthetic chabazites normally referred to as "molecular sieves") which have been found to impart the necessary degree of cracking activity to the catalyst. In this connection the term "high cracking activity" is employed herein to designate those catalysts having activity equivalent to a Cat. A value of at least 25 or a quinoline number of at least 20 (J. Am. Chem. Society, 72, 1554 (1950). These cracking components or supports for the hydrogenating metal component are normally readily attacked by strong aqueous acid. Particularly preferred catalyst components are synthetically prepared silica-alumina compositions having a silica content in the range of from about 15 to 99% by weight and an alumina content of 1 to 85% by weight. The hydrocracking conversion is normally preceded by a treatment to remove excess nitrogen content from the hydrocarbon charging stocks. Preferably, this is accomplished by a hydrodentrification process comprising contacting said feed with hydrogen and a suitable catalyst under hydrofining conditions, such as a space velocity of 0.2 to 10 LHSV, a pressure of 500–5000 p.s.i.g. and a temperature of 500–850° F.

When in the course of a hydrocracking operation the catalyst becomes sufficiently deactivated so that restoration of catalyst activity is necessary or desired, the hydrocracking operations are discontinued usually with the catalyst at the end of run at an elevated temperature such as 700–750° F. To conduct the rejuvenation the catalyst bed is cooled down preferably to that temperature at which the reaction of the acidic treating agent (which may be warmed, if desired) causes the temperature of the catalyst to rise into the temperature range desired for the acid treatment.

The activities of catalysts can be compared in terms of their ability to convert a feed stock to lower boiling products. One way to make such comparison is to determine the amount of conversion at standard conditions of a feed stock such as n-decane in the presence of the catalyst to be compared. By determining the relative conversion under the same operating conditions for fresh and treated catalysts, one gets a measure of the activity of a rejuvenated catalyst compared to the fresh catalyst.

Another method for determining relative activities is to subject the catalyst to a standard test from which the "activity index" of the catalyst can be determined and which can be used effectively to compare various catalysts. The test is carried out with a selected standard and readily obtainable hydrocarbon feed stock and is operated under specific conditions of temperature, pressure, feed space rate, etc. The feed stock employed is a catalytic cycle oil obtained as a distillate fraction from a fluid-type cracking unit, the fraction being one containing essentially-equal proportions of aromatics and of paraffins plus naphthenes. Such distillate fraction is hydrofined to produce a stock having the following inspections:

| | |
|---|---:|
| Gravity, ° API | 29.2 |
| Aniline point, ° F. | 100.2 |
| Nitrogen (basic), p.p.m. | 0.3 |
| Aromatics, vol. percent | 47 |
| Naphthenes, vol. percent | 37 |
| Paraffins, vol. percent | 19 |

ASTM distillation (D-158) (percent):

| | |
|---|---:|
| Start | 362 |
| 5 | 441 |
| 10 | 453 |
| 30 | 481 |
| 50 | 500 |
| 70 | 523 |
| 90 | 560 |
| 95 | 577 |
| End point | 624 |

The equipment employed in determining the fouling rate of the catalyst is a conventional continuous feed pilot unit, operated once-through with hydrocarbon feed and hydrogen gas. It consists of a cylindrical reaction chamber operated downflow with a preheating section, followed by a section containing the catalyst under test, and enclosed in a temperature controlled metal block to permit controlled temperature operation, together with the necessary appurtenances, such as feed burettes, feed pump, hydrogen supply, condenser, high pressure separator provided with means for sampling the gas and liquid phases, back pressure regulators, and thermocouples.

In testing a catalyst to determine its activity index, the hydrofined cycle oil test stock described above, along with 12,000 s.c.f. of hydrogen per barrel of feed is passed through a mass of catalyst at a liquid hourly space velocity of 2 and at a catalyst temperature of 570° F. and a pressure of 1200 p.s.i. Samples of the products are periodically collected during the run. Light hydrocarbons are allowed to flash off the samples at room temperature and pressure, after which the API gravity of the sample is determined. Usually the test is run for about 50 hours and the API gravity of the product at the end of the run is used in calculating the activity index since at the end of the run the operation is at steady state conditions. The increase in API gravity of the product over that of the API gravity of the feed has been found to be a rapid and convenient method of characterizing the activity of catalyst which correlates smoothly with conversion. The API gravity increase is referred to as the activity index of the catalyst. The differences in activity index levels between catalysts have been found to be highly significant. However, the activity index levels are not linear in function. For example, doubling the activity index from 14 to 28 corresponds to a tripling in the per pass conversion from 20 to 56 volume percent. Thus, what may appear to be a nominal increase in the activity index is, in fact, a substantial increase in activity and of considerable importance.

In the following more detailed description, the invention is described for illustrative purposes in terms of a hydrocracking catalyst composed of a nickel sulfide as the hydrogenating metal component disposed on a siliceous cracking support such as silica-alumina. The rejuvenation method of the present invention is employed following an extended on-stream period of at least 500 to 750 hours, usually over 1000 hours, up to several thousand hours, e.g., 4000 hours, under hydrocracking conditions. After such rejuvenation to an activity approaching its original activity, the catalyst is placed back in hydrocracking service for subsequent cycles of extended on-stream periods of at least 500 hours, generally over 750 hours and usually over 1000 hours.

To illustrate the process of the present invention, tests were carried out on catalysts which were prepared by the procedure of the following example.

*Example 1*

A catalyst containing nickel sulfide on silica-alumina was prepared by impregnating silica-alumina particles with a solution of nickel nitrate in a concentration sufficient to provide the catalyst with 6 weight percent nickel on a dry basis. The silica-alumina particles employed contained about 90% silica and had a Cat. A value in excess of 40 before being impregnated with the hydrogenating metal component. After impregnation and drying, the catalyst was thermactivated by contact for 2.2 hours with a stream of hot air at an average temperature of 1427° F. Thereafter the catalyst was sulfided and used for hydrocracking in a multibed reactor for several thousand hours on a hydrocarbon feed stock having a total nitrogen content of less than 1 p.p.m. The hydrocracking operation was discontinued when the temperature necessary to maintain hydrocracking conversion of the hydrocarbons at 60% had risen to approximately 750° F. An analysis of the catalyst at this stage showed that it had metal crystallite sizes of the order of 500 to over 2000 A., with the larger particles being in the first bed of the reactor. Air blowing the spent catalyst by conventional procedures to remove carbonaceous deposits produces catalysts having low activities. Particularly poor results are obtained with the catalyst having the larger size metal crystallites.

*Example 2*

In a series of tests the relative activities of catalysts subjected to varying treatments were compared by measuring their effectiveness for cracking n-decane in a continuous flow fixed bed, high pressure micro-catalytic reactor. In such test 3 ml. of catalyst is supported inside of a 0.79 cm. I.D. stainless steel tube surrounded by a heavy walled steel block inside an electrically heated oven. Catalyst temperatures are measured by a chromel-alumel thermocouple located on the reactor wall at the central portion of the catalyst bed. Said rates are measured by a micro-feeder pump, and the hydrogen rate is measured by a wet test meter. Liquid products and gas are analyzed by gas chromatography. In the tests of each of the catalysts, the following conditions are observed. n-Decane is fed at a liquid hourly space velocity of 16.0 along with hydrogen at a hydrogen/decane mol ratio of 10 and brought into contact with the catalyst at a temperature of 550° F. and a total pressure of about 1200 p.s.i.a.

In the series of tests Catalysts A was a fresh catalyst prepared from the silica-alumina particles used in Example 1 by impregnation with 2.5 molar nickel nitrate solution to dispose on the silica-alumina about 6 percent of nickel. The catalyst was dried at about 600° F. and then thermactivated by contact for about two hours with dry air at about 1400° F. Catalyst A was used for comparison purposes. The remaining Catalysts B–H were all samples of the same spent catalyst as described in Example 1 after various treatments. Catalyst B was regenerated by stepwise oxidation in dry air at 800° F. for 2 hours and at 1000° F. for 2 hours and then thermactivated in dry air for about 2 hours at about 1400° F. Catalysts C–H with the carbonaceous deposits still on the surface were first treated with about 29 cc. aqueous acetic acid per 100 gms. of spent catalyst, the temperature being adjusted to 150° F. Thereafter without removing the aqueous treating solution the catalysts were carefully dried and then gradually heated in a dry air stream up to a final high temperature to decompose the acetates of the hydrogenating metal component, converting the acetates to metal oxides and to burn off the carbonaceous deposits. The acid strengths, time of acid treatment and the conditions of the final heat treatment along with the relative activities (compared to fresh catalyst activity on the basis of n-decane conversion) are given in the following Table I. Before testing each catalyst was sulfided at 550° F. with dimethyl disulfide in admixture with hydrogen.

derived from comparing the activity indexes to that for the fresh catalyst blank are given in the following Table II, along with a number for the increase in relative ac-

TABLE I

| Catalyst | Acid Strength (Molar) | Time of Acid Treatment (Hrs.) | Heat Treatment | | Relative Catalyst Activity, Percent |
|---|---|---|---|---|---|
| | | | Temp. (° F.) | Time (Hrs.) | |
| A (fresh) | | | | | 100 |
| B (air regeneration) | | | | | 28 |
| C (spent) | 7.8 | 50 | 1,000 | 2 | 65 |
| D (spent) | 5.0 | 1 | 1,000 | 2 | 57 |
| E (spent) | 5.0 | 17½ | 1,000 | 2 | 39 |
| F (spent) | 5.0 | 17½ | 1,050 | 2 | 39 |
| G (spent) | 5.0 | 17½ | 1,050 | 6 | 57 |
| H (spent) | 5.0 | 17½ | 1,200 | 2 | 48 |

The above tests illustrate that contacting spent catalyst before removal of the carbonaceous deposits with weak acid such as acetic acid in accordance with the present invention brings about a substantial rejuvenation of the tivity over the air regenerated samples A and E for each of the test series. The last value is given in the last column and indicates the improvement over regeneration by merely removing carbonaceous deposits.

TABLE II

| Catalyst | Time of Acid Treatment (Hrs.) | Acid Strength (Molar) | Acid/Catalyst Ratio (cc. acid/100 gms. cat.) | Percent of Fresh Activity | Increase in Percentage Activity Over Air Regeneration |
|---|---|---|---|---|---|
| First Series: | | | | | |
| A (Air regenerated) | | | | 23 | 0 |
| B | 7 | 10 | 35 | 35 | +12 |
| C | 24 | 10 | 35 | 29 | +6 |
| Second Series: | | | | | |
| D | | | | 25 | 0 |
| E | 1 | 10 | 38 | 42 | +17 |
| F | 1 | 10 | 35 | 42 | +17 |
| G | 7 | 7.5 | 38 | 43 | +18 |
| H | 7 | 10 | 35 | 38 | +13 |
| I | 24 | 7.5 | 38 | 30 | +5 |
| J | 24 | 10 | 35 | 37 | +12 |
| Third Series: | | | | | |
| K | | | | 45 | 0 |
| L | 1 | | | 57 | +12 | spent catalyst. Also, the data illustrate that at the same strength acid, a 1-hour treatment gives results superior to acid treatment for 17½ hours but that longer heat treatment at the high final temperature is preferable with the longer acid treatment.

*Example 3*

Comparative hydrocracking tests were also carried out to determine the activity index level, in accordance with the activity index test procedure described hereinabove, of samples of catalysts treated in various ways. In the first series samples of spent catalyst from the second bed in the hydrocracking operation described in Example 1 were treated as follows: Catalyst A was regenerated by stepwise oxidation in dry air at 800° F. for 2 hours and at 1000° F. for 2 hours. Catalysts B and C were treated with aqueous acetic acid at 150° F. for various periods of time, acid strengths and acid/catalyst ratios, as shown in Table II below, and then were dried and gradually heated to a final temperature of 100° F. for 2 hours. In a second series of tests samples of spent catalysts from the third bed in the hydrocracking operation described in Example 1 were treated as follows: Catalyst D was regenerated in air in the same manner as Catalyst A. Catalysts E, F, G, H, I and J were treated in the same manner as Catalysts B and C. In a third series of tests samples of spent catalyst from the fourth bed as described in Example 1 were treated as follows: Catalyst K was air regenerated like Catalyst A and Catalyst L was treated like Catalyst F. Before testing, each of the catalysts was sulfided as described in Example 2. The activity levels for each of the test catalysts were obtained and compared to that obtained for a freshly prepared catalyst used as a blank in the same sequence of tests. The times of acid treatments and the relative activities It will be observed that in each instance the treatment in accordance with the present invention resulted in a substantial improvement in activity as compared to the air regenerated samples. Comparisons of results from treatments of different beds of spent catalysts, i.e., of different test series, are not appropriate since the catalysts from the different beds are deactivated to different degrees and cannot be restored with the same ease. It will be noted that these tests further illustrate that the time of acid treatment should preferably be below about 10 hours.

These results illustrate that, by the process of the present invention, deactivated catalysts can be rejuvenated so that the life of the catalyst can be substantially extended. Such extension of catalyst life contributes significantly to the economic value of the low temperature hydrocracking process. Further, the catalyst rejuvenated by the present procedure has a high activity that lasts for a long time which is in contrast to the relatively small increase in activity and rapid degeneration of such activity when the catalyst is conventionally regenerated by air oxidation to remove the carbonaceous deposits.

The process can be also carried out within the reactors without removing the catalysts. This ability is a distinct economic advantage, particularly since the procedure can be carried out in reactors of usual construction materials without incurring substantial corrosion.

We claim:

1. A process for rejuvenating deactivated hydrocracking catalysts containing at least one hydrogenating metal component other than noble metals and an active cracking support which catalyst after long exposure to hydrocarbon feed under hydrocracking conditions has accumulated carbonaceous deposits and has become deactivated with the metal hydrogenating component so changed that conventional removal of the accumulated carbonaceous deposits does not result in recovery of a substantial percentage of the original hydrocracking activity, which process comprises contacting said catalyst before removal of the carbonaceous material deposited thereon during use with an aqueous solution of weak organic acid which is capable of forming salts of said hydrogenating material, said solution having an acid concentration of at least 5 molar, said contacting including at least one hour at over 100° F. and until a predominant proportion of said hydrogenating metal component is converted to said salts, and thereafter without washing said salts from the treated catalyst decomposing said salts and removing said carbonaceous material.

2. The process of claim 1 wherein the acid concentration is at least 7 molar.

3. The process of claim 1 wherein the catalyst is contacted with acid for no more than seven hours.

4. The process of claim 1 wherein the step of removing carbonaceous material and decomposing said salts is conducted in a stream of dry oxidizing gas with the temperature raised into the range of 800–1400° F. for at least one hour after substantially all the carbonaceous material has been removed.

5. In a process of rejuvenating a thermactivated support hydrocracking catalyst containing at least one hydrogenating Group VIII metal component other than noble metals and an active siliceous cracking support, which catalyst after long exposure to hydrocarbon feed under hydrocracking conditions has accumulated carbonaceous deposits and has become deactivated, the improvement of rejuvenating said catalyst while preserving the thermactivated properties which comprise contacting said deactivated catalyst before removal of said carbonaceous deposits with an aqueous solution of weak organic acid capable of forming salts of said hydrogenating material, which salts are decomposable below about 1200° F., said solution having an acid concentration of at least 7 molar, said contacting being continued for at least one hour at over 100° F. until a predominant proportion of said hydrogenating material component is converted to said salts, and thereafter without washing said salts from the treated catalyst simultaneously decomposing said salts and removing said carbonaceous deposits at a temperature from 800 to 1200° F.

6. In a process for hydrocracking hydrocarbon stocks in a hydrocracking reactor at elevated temperatures and pressures with excess hydrogen and a supported hydrocracking catalyst which before long exposure to hydrocarbon feed under hydrocracking conditions is an active catalyst composed of at least one hydrogenating metal component selected from the group consisting of Group VIII metals and compounds thereof, other than the noble metals and compounds thereof disposed on a high surface area cracking support susceptible to attack by strong acids, but which catalyst after long exposure to hydrocarbon feed under hydrocracking conditions has accumulated carbonaceous deposits and has become deactivated with the metal hydrogenating component so changed that conventional removal of the accumulated carbonaceous deposits does not result in recovery of a substantial percentage of the original hydrocracking activity, the improvement which comprises extending the effective on-stream time by rejuvenating said catalyst when it becomes so deactivated and without removing said catalyst from said hydrocracking reactor by contacting said deactivated catalyst before removal of said carbonaceous deposits with an aqueous solution of at least 5 molar of weak organic acid capable of forming salts of said hydrogenating metal for at least one hour at a temperature over 100° F. until a predominant proportion of said hydrogenating material component is converted to said salts and thereafter without washing said salts from the treated catalyst decomposing said salts and removing said carbonaceous material, and then conducting hydrocracking operations over the resulting rejuvenated catalyst.

7. The process of claim 1 wherein said deactivated catalyst contains 4 to 20% of hydrogenating metal component.

References Cited by the Examiner
UNITED STATES PATENTS

| | | | |
|---|---|---|---|
| 2,380,731 | 7/1945 | Drake et al. | 212—413 |
| 3,072,560 | 1/1963 | Paterson et al. | 208—111 |
| 3,134,732 | 5/1964 | Kearby et al. | 252—413 |
| 3,165,478 | 1/1965 | Hanschild et al. | 252—413 |
| 3,166,489 | 1/1965 | Mason et al. | 208—111 |

ALPHONSO D. SULLIVAN, Examiner.

DELBERT E. GANTZ, Primary Examiner.